(12) United States Patent
Hubble et al.

(10) Patent No.: US 10,018,463 B1
(45) Date of Patent: Jul. 10, 2018

(54) SHADOW MOIRÉ WITH TOPSIDE INFRARED HEATING

(71) Applicant: Akrometrix Inc., Atlanta, GA (US)

(72) Inventors: Neil Thomas Hubble, Atlanta, GA (US); Richard James Wilson, Lilburn, GA (US); Gregory James Petriccione, Marietta, GA (US); Joseph Carlton Gheesling, Lilburn, GA (US); Igor Varzari, Cumming, GA (US)

(73) Assignee: Akrometrix Inc., Atlanta, GA (US)

( * ) Notice: Subject to any disclaimer, the term of this patent is extended or adjusted under 35 U.S.C. 154(b) by 0 days.

(21) Appl. No.: 15/688,225

(22) Filed: Aug. 28, 2017

(51) Int. Cl.
*G01B 11/16* (2006.01)
*G01B 11/25* (2006.01)

(52) U.S. Cl.
CPC .......... *G01B 11/167* (2013.01); *G01B 11/254* (2013.01)

(58) Field of Classification Search
CPC ..................... G01B 11/167; G01B 11/254
See application file for complete search history.

(56) References Cited

U.S. PATENT DOCUMENTS

| | | |
|---|---|---|
| 3,614,237 A | 10/1971 | Kyle et al. |
| 4,547,400 A | 10/1985 | Middleton et al. |
| 5,601,364 A * | 2/1997 | Ume .................... G01B 11/167 |
| | | 250/237 G |
| 5,969,819 A | 10/1999 | Wang |
| 6,168,064 B1 | 1/2001 | Berkin |
| 6,564,166 B1 * | 5/2003 | Ume ...................... G01B 11/25 |
| | | 702/136 |
| 8,233,784 B2 | 7/2012 | Zenteno et al. |
| 9,383,300 B2 | 7/2016 | Chiavone et al. |
| 2015/0268143 A1 * | 9/2015 | Chiavone ................. G01N 1/44 |
| | | 356/244 |

* cited by examiner

*Primary Examiner* — Roy M Punnoose

(74) *Attorney, Agent, or Firm* — King & Spalding

(57) ABSTRACT

A shadow moiré system (herein 'system') includes a glass grating that is disposed above a sample in an oven top and glass lid assembly of an oven such that the glass grating is vertically adjustable. Further, the system includes shadow moiré optics that is disposed above the glass grating. Furthermore, the system includes a vertical motion assembly that is disposed in an oven bottom assembly of the oven along with a sample support to vertically move the sample support and the sample disposed thereon. Additionally, the shadow moiré system includes a top heater assembly that is disposed in the oven top and glass lid assembly above the glass grating and a bottom heater that are separately controllable to generate and apply heat to the sample to observe any changes in flatness in a surface of the sample with temperature change.

25 Claims, 13 Drawing Sheets

SHADOW MOIRÉ WITH TOPSIDE INFRARED HEATING

TECHNICAL FIELD

This invention relates generally to optical metrology systems for surface flatness, known as warpage, and specifically to shadow moiré based technology.

BACKGROUND

The flatness of a surface as it is heated and cooled is desired to be known across the distribution chain of microelectronics design and manufacturing companies. Flatness over temperature, or warpage, is most commonly measured for surface mount components that are subject to a reflow temperature profile. The reflow temperature profile is used in microelectronics assembly process in which samples are heated to a temperature at which metals in numerous areas in the surface mount components liquefy at the peaks of the reflow profile, coalesce together, and refreeze during cooling. The now connected/formed metal joints serve as multiple electrical connections within an electronic sample. The term surface mount technology is generally used to describe this type of reflow attachment where one or more surface mount components are attached to an underlying board. Certain levels of warpage in surface mount samples can cause problems in creating the electrical connections between sample and board.

Fast and full field warpage data sets are required to meet industry demands for measuring warpage in microelectronics samples, as simulating the temperatures and timing of the reflow profile requires gathering large quantities of surface flatness data in a short amount of time (1-4 seconds). Some original efforts to meet these demands were claimed in U.S. Pat. No. 5,601,364 to Ume (1997), describing an apparatus for measuring thermally induced warpage in printed circuit boards (PCBs). This apparatus used heating elements and a shadow moiré technique to look at flatness. Accuracy of this described apparatus was viable for overall flatness measurement of PCBs in this era. However, the heating methods and application of a shadow moiré technique described in the Ume patent neither covered the thermal demands nor warpage measurement accuracy demands that would become a requirement of surface mount components in the coming years. The Ume patent is founded based on multiple thermal heating concepts as well as shadow moiré concepts. A shadow moiré system is comprised of a grating, a camera, and a directional light source. A grating is a piece of glass with alternating opaque lines and transparent lines spaced in a constant periodic pattern.

In order to meet accuracy demands needed for the emerging surface mount technology market the concept of phase stepping is introduced into shadow moiré technology in U.S. Pat. No. 5,969,819 to Wang (1999). The concept of phase stepping is still relevant to the shadow moiré system herein. However, developments in a flatness acquisition method are not part of the patentable art claims.

Other technologies have been pursued using an oven and a projection moiré system. Projection moiré is a similar technology to shadow moiré, using some similar mathematical approaches, camera images, and phase shifting to capture surface flatness. The two measurement techniques have different pros and cons in their use for capturing thermal warpage. At the time of this writing, shadow moiré remains the more popular technique for thermal warpage and the specific technique used in listed patentable claims. Shadow moiré has an advantage in thermal warpage measurement accuracy that is desirable for this technology. In particular shadow moiré has an advantage over fringe projection in scaling to larger measurement areas. Larger areas for measurement are needed, not only for larger samples, but also to increase the quantity of samples that can be run in a single thermal profile, improving equipment throughput.

Other approaches for heating have also been pursued in conjunction with a shadow moiré technique. U.S. Pat. No. 9,383,300 to Chiavone and Gheesling (2016) describes a convection based solution for heating samples through reflow temperatures and measuring with a shadow moiré technique. This approach is valuable, but it also has certain limitations. Due to the need for a grating glass above and near to a sample under a shadow moiré test, heated air must blow in from the perimeter of a sample area that is to be heated. Also, restrictions apply to a shadow moiré metrology system due to the grating glass being disposed above and near to the sample. With heated air coming in from only the sides of the sample area, the approach of Chiavone and Gheesling has limitations with respect to the allowable size of said sample area. In practice, the patent is used in a 70 mm diameter circle. The usable size for a convection based shadow moiré system is restricted based on two requirements:
  a) Air speed: Increasing velocity of air can cause instability in the sample location, in that a sample can "flutter", shift, or even fly away. The need for increased speed of flow is for both heating rates as well as the following requirement (b).
  b) Temperature uniformity: Blowing hotter air from the perimeter of a cooler sample area will always cause a decrease in air temperature as energy is lost to structures and samples on the perimeter of the sample area. This causes surface on the perimeter of an area to be hotter and surfaces further inside to be cooler.

The combination of the above mentioned patents leaves a need for a solution in which temperature uniformity can be maintained over a large area (>a 70 mm diameter circle in practice) while being able to reliably use a shadow moiré technique.

SUMMARY

In one aspect, the present disclosure relates to a shadow moiré measurement system. The shadow moiré measurement system includes a shadow moiré optics, and an oven that is disposed below the shadow moiré optics. The oven includes an oven top and glass lid assembly and an oven bottom assembly that are hingedly coupled to each other using a main counterbalance. Further, the shadow moiré measurement system includes a grating glass that is disposed in the oven top and glass lid assembly of the oven. The shadow moiré optics and the grating glass operate in concert to create shadow moiré measurement patterns. Furthermore, the shadow moiré measurement system includes a sample support that is disposed below the grating glass in the oven bottom assembly of the oven and configured to hold a sample under test. Additionally, the shadow moiré measurement system includes a stage motion assembly that is coupled to the sample support and disposed in the oven bottom assembly of the oven. The stage motion assembly is configured to provide vertical motion of the sample support. The shadow moiré measurement system also includes a top heater assembly that is disposed in the oven top and glass lid assembly and above the grating glass and the sample support; and a bottom heater that is disposed in the oven bottom assembly and below the sample support. The top heater assembly and the bottom heater are configured to be individually and independently controlled via their respective temperature feedback loops for uniform heating in the oven.

In another aspect, the present disclosure relates to a shadow moiré measurement system that includes an oven. The oven includes an oven top and glass lid assembly. The oven top and glass lid assembly houses a top heater assembly that is configured to output light that falls within falls within 700 to 2750 nanometers light wavelength. The top heater assembly includes a plurality of heater elements. Each heater element includes a wound element that is configured to carry electrical current therethrough to generate visible light and shortwave infrared light. Further, each heater element includes a dark ruby quartz tube surrounding the wound element and configured to filter visible light generated by the wound element. Further, oven top and glass lid assembly houses a grating glass that is disposed below the top heater assembly such that the grating glass is vertically adjustable within the oven top and glass lid assembly. The grating glass is configured to pass light having light wavelength within 700 to 2750 nanometers therethrough to heat a sample disposed in the oven. Further, the oven includes an oven bottom assembly that is hingedly coupled to the oven top and glass lid assembly using a main counterbalance. The oven bottom assembly houses a sample support that is disposed below the grating glass such that the sample support is vertically adjustable within the oven bottom assembly. The sample support is configured to hold a sample that occupies an area greater than a 70 mm diameter circle.

In yet another aspect, the present disclosure relates to a method of a shadow moiré measurement system. The method includes heating a test sample that is placed in an oven of the shadow moiré measurement system using a top heater assembly and a bottom heater of the oven such that a temperature of the test sample follows a plot of temperature versus time that is created prior to the step of placing the test sample on the sample support of the oven. The top heater assembly and a bottom heater are individually and separately controlled. The test sample is placed on a sample support of the oven that is configured to hold test samples that occupy an area greater than a 70 mm diameter circle. The sample support is disposed in an oven bottom assembly of the oven and is coupled to a stage motion assembly that is configured to provide a vertical motion to the sample support. In particular, the top heater assembly is disposed in an oven top and glass lid assembly of the oven and is configured to output light that falls within falls within 700 to 2750 nanometers light wavelength. Further, the top heater assembly is disposed above a grating glass that is housed in oven top and glass lid assembly and configured to pass the output light from the top heater assembly having light wavelength within 700 to 2750 nanometers light wavelength therethrough. The oven top and glass lid assembly of the oven is disposed above and hingedly coupled to the oven bottom assembly using a counterbalance such that the test sample is disposed below the grating glass. Further, the method includes, capturing, using a shadow moiré optics assembly, images of shadow moiré patterns created by the grating glass in response to heating the test sample. The images are captured at pre-determined time periods and pre-determined temperatures of the test sample during the heating of the test sample. Furthermore, the method includes determining, based on the captured images, a warpage of the test sample as a result of heating the test sample.

The present disclosure describes a thermal shadow moiré measurement system that comprises bottom and top side infrared (IR) radiative heaters. In order to make a viable solution, specific IR radiative light wavelengths are chosen and filtered; and additionally, IR reflective surfaces are used to redirect energy. While not being limited by the following list, several objects and advantages that can be achieved by one or more example embodiments of the thermal shadow moiré measurement system set forth in the present applications are:

a) to provide an even and fast heating and accurate warpage measurement;
b) to provide visible light transparency for viewing of a sample inside an oven and below a grating as seen by a camera and illuminated by a directional light;
c) to provide a top heater including infrared radiative heater bulbs located above the grating to heat the top of measured samples;
d) to provide infrared radiative energy above the grating that is specifically short wave infrared light between 700 and 2750 nanometer wavelengths to allow transmission of infrared energy through the grating made of Borofloat glass;
e) to provide filtering of visible light wavelengths out of top heater bulb radiated wavelengths, so as to not interfere with a shadow moiré measurement;
f) to provide a bottom heater inside the oven with inner and outer heater zones distributed in a pattern to promote temperature uniformity and allow different power percentages between inner and outer heating zones;
g) to provide independent control feedback loops between the bottom and top heaters and thermocouples on top and bottom of a sample for each heater control;
h) to provide an area for even heating, no greater than +/−5° C. temperature differentials, and shadow moiré measurement up to 375×375 mm; and
i) to provide an infrared wavelength reflective coating at the top the oven to redirect further energy to the top of tested samples.

Further objects and advantages are to use a shadow moiré technique for warpage measurement, combined with a phase stepping process for accurate and timely full field warpage measurements. These and other aspects, objects, advantages, features, and embodiments of the thermal shadow moiré measurement system will be apparent from the following description and the appended claims.

BRIEF DESCRIPTION OF THE DRAWINGS

The foregoing and other features and aspects of the present disclosure are best understood with reference to the following description of certain example embodiments, when read in conjunction with the accompanying drawings, wherein.

Figure 1:
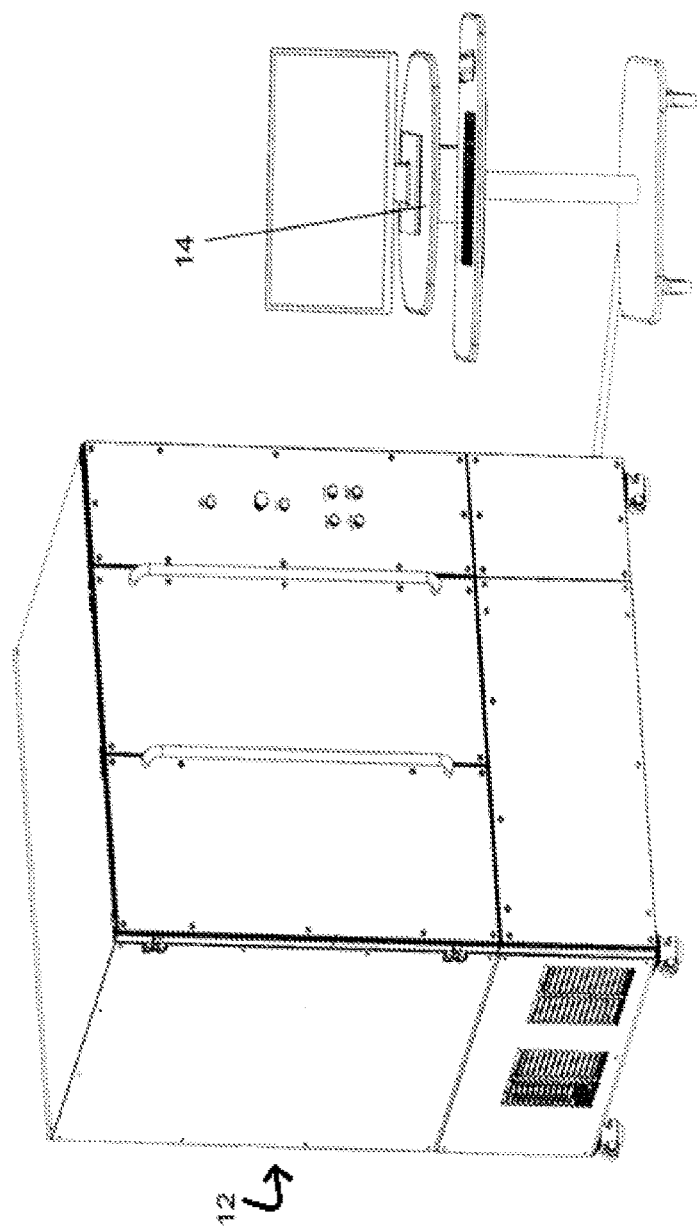
FIG. 1 illustrates an orthogonal view of a thermal shadow moiré measurement system, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a shadow moiré system with phase stepping for full field flatness measurement of a sample surface. The shadow moiré system consists of a glass grating above the sample, a camera and line light above the grating, and a vertical motion system to move either grating or sample. Heat can be applied to the sample to observe any changes in flatness with temperature change. The glass grating must be placed in close proximity to the measured surface. Due to the grating proximity, shadow moiré systems currently use either convective heating or infrared radiation heating from the non-grating side. A new solution is presented which utilizes topside infrared radiation heating. Heaters are placed above the grating and heat penetrates through the shadow moiré grating. Light wavelengths between 700 nanometers and 2750 nanometers are required for the application. Wavelengths shorter than 700 nanometers would emit visible light through the shadow moiré grating and negatively affect the shadow moiré measurement. Longer wavelengths above 2750 nanometers would not effectively transmit through the Borofloat glass grating. To achieve the required narrow wavelength band, short wave wound element heater bulbs are used. The wavelengths of this bulb type produce inconsequential amounts of light at the upper limit of 2750 nanometers as designed. However, light wavelengths below 700 nanometers are filtered via dark red ruby quartz tubes around the elements. Additional infrared energy is redirected to the top of the sample by an infrared reflective coating applied to the oven lid glass.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

A preferred embodiment of the thermal shadow moiré measurement system of the present disclosure is illustrated in FIG. 1, where the thermal shadow moiré measurement system 12 (herein 'measurement system') is shown in its entirety in an orthogonal view. A personal computer (PC) interface assembly 14 is shown to the right of the measurement system 12. The PC interface assembly 14 contains generic monitor, keyboard, and mouse on a table with wheels for interfacing with a PC 15 shown in FIG. 2.

Figure 2:
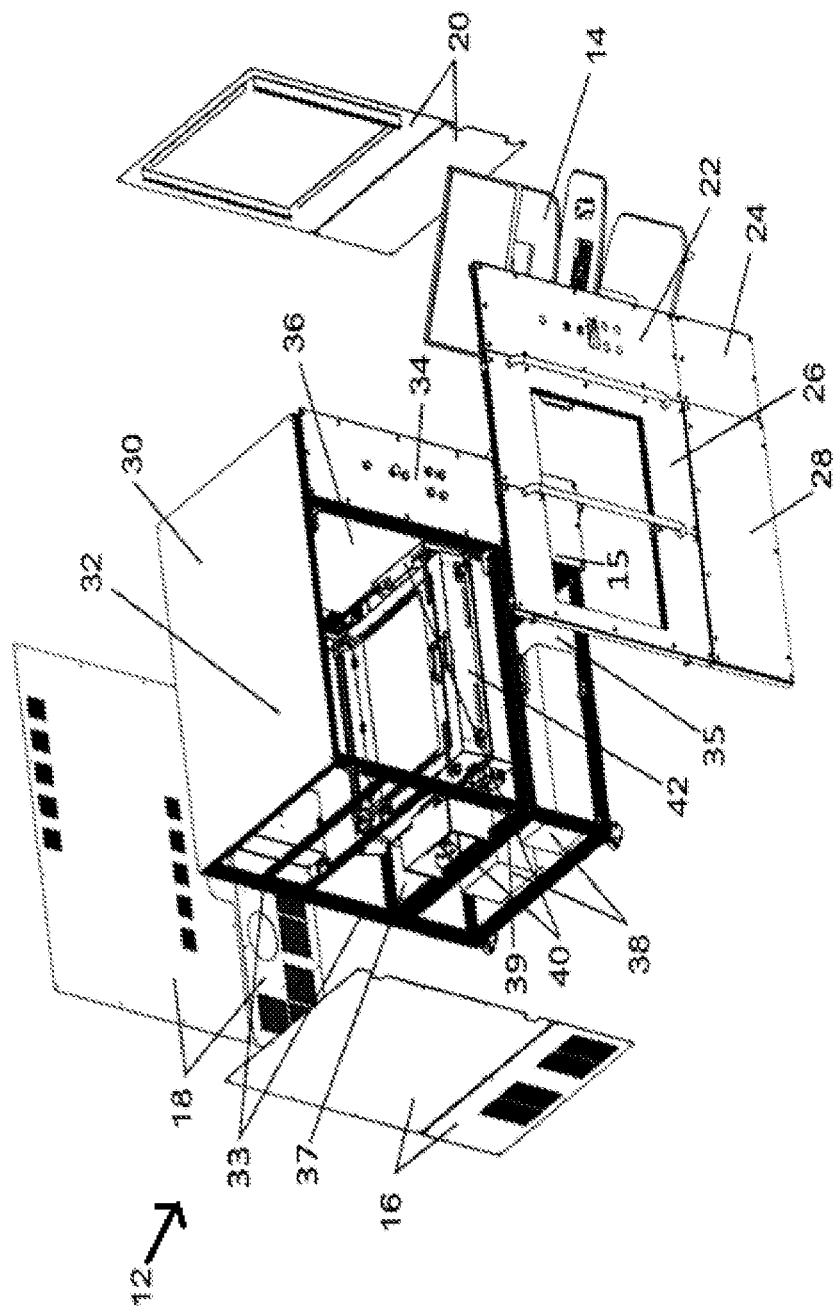
FIG. 2 illustrates a view of the thermal shadow moiré measurement system with outer panels and doors exploded away, in accordance with example embodiments of the present disclosure.
Figure 12:
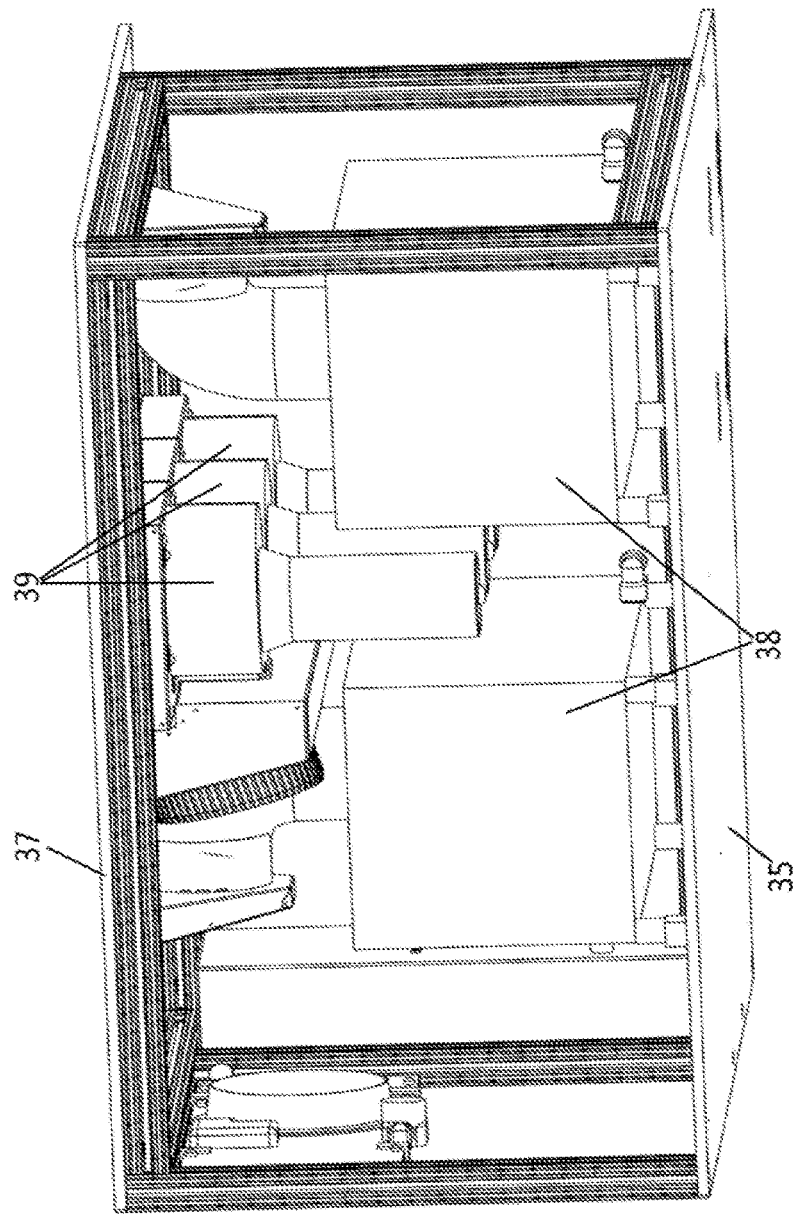
FIG. 12 illustrates the exhaust motors that are disposed below an oven plate of the thermal shadow moiré measurement system of FIG. 1, in accordance with example embodiments of the present disclosure.

Turning to FIG. 2, this figure illustrates an exploded view of the measurement system 12. The measurement system 12 is housed by surrounding sheet metal shown as left cover panels 16, back cover panels 18, right cover panels 20, and a top cover panel 30. The panels are used to keep out external light and give the system a completed appearance. The front of the measurement system 12 includes a button assembly cover panel 22 used to cover wires of a button assembly 34. The button assembly 34 has buttons for control of main power, emergency stop, system reset, cooling controls, and lid latching controls. Further, the front of the measurement system 12 includes a PC cover door 24 that opens toward a user and allows the user access to the front the PC 15. Furthermore, the front of the measurement system 12 includes a front door 26 that is a bi-fold door that is pulled toward the user and to the user's left (when user faces the front door 26) allowing access to the inside of the measurement system 12. In addition to the front door 26, the front of the measurement system 12 includes a lower cover panel 28 that is used to cover the lower portion of the measurement system 12 for aesthetic reasons. The outer panels and doors are mounted to a frame assembly 33. The frame 33 gives the form of the overall measurement system, along with a base plate 35 disposed at the bottom of the measurement system 12 and an oven plate 37 that is disposed at a distance above the base plate 35. Shadow moiré optics 32 are mounted to the top of the frame 33 such that the oven plate 37 is disposed between the Shadow moiré optics 32 (herein 'optics') and the base plate 35. The optics 32 consist of a camera, lens, light source, line light, and mirror. As these optics 32 are not unique in this system, but rather generic to shadow moiré measurement, the specific of the optics are not detailed here. An electrical cabinet 36 is mounted to the frame 33 and is used to power and control the electronics of the measurement system 12. Two air conditioning units 38 are mounted on the base plate 35 and are used to blow air into an oven assembly 42 to reduce the internal oven temperature. Three exhausts motors 39 (shown in FIG. 12) mount to the underside of the oven plate 37 and are used to draw air out of the oven 42, also used to reduce internal oven temperatures, working in tandem with the air conditioning units 38. A stage motion assembly 40 is mounted to an opposite side of the oven plate 37 and passes inside the oven 42. The stage motion assembly is detailed further in FIG. 3, and the oven 42 is detailed further in FIGS. 4-9.

Figure 3:
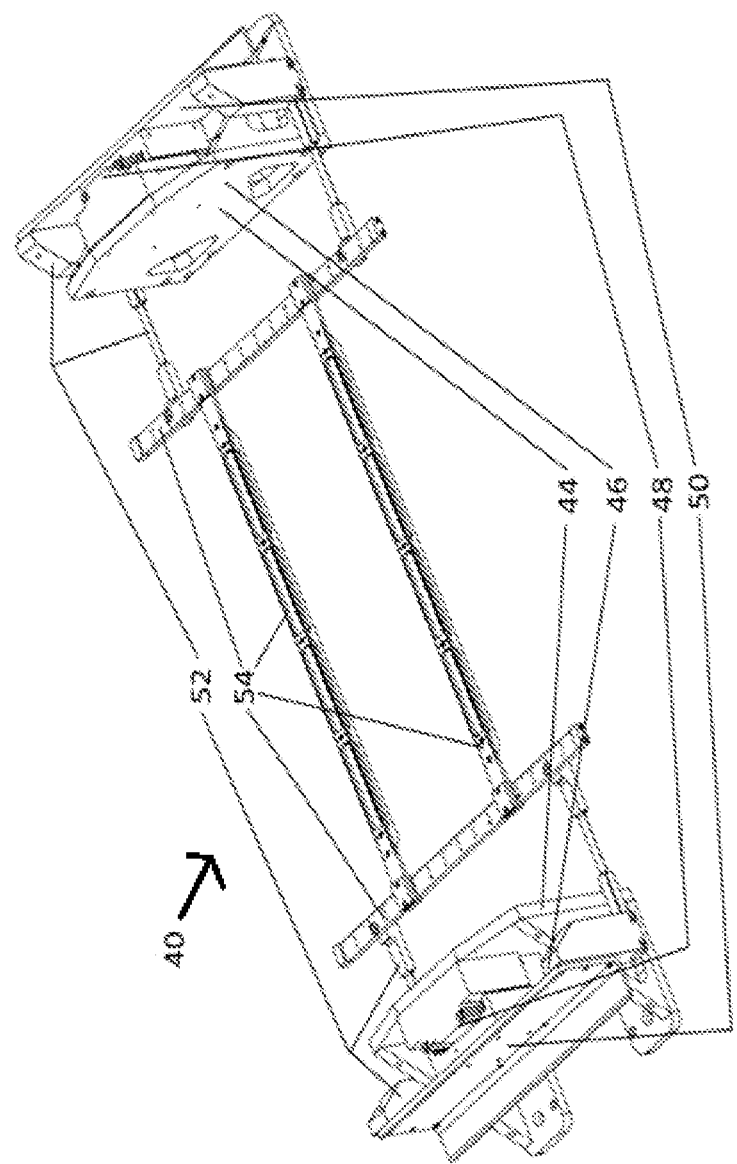
FIG. 3 illustrates a stage motion assembly for moving a sample up and down within an oven of the thermal shadow moiré measurement system, in accordance with example embodiments of the present disclosure.

Turning to FIG. 3, this figure illustrates the stage motion assembly 40. The stage motion assembly 40 mounts to the oven plate 37 of the measurement system 12 via two stage mounts 44. The stage mounts 44 are mounted to two vertical motion stages 48. The stages 48 are coupled to two vertical motion motors 46. The motors 46 spin as required by the measurement system 12. The stages 48 translate the spinning motor 46 motion to vertical motion, which is required for the shadow moiré measurement technique. Two L brackets 50 mount to the stages 48. The L brackets 50 also mount to four main support arms 52. The main support arms 52 pass through the outer portion of the oven 42 and more specifically through four main support arm seals 82 shown later in FIG. 5. Once inside the oven the main support arms 52 connect to a sample support 54. The sample support 54 is used to hold a sample under test (interchangeably referred to as 'test sample' without departing from a broader scope of the disclosure) within the system 12. The combined pieces of the sample support structure move up and down with the spinning motion of the motors 46 which is changed to vertical motion by the stages 48. The sample support 54 and sample under test rest underneath a Ronchi ruled grating 90 shown later in FIG. 6. The combination of the optics 32, stage motion assembly 40, and grating 90 make up the required components for a shadow moiré measurement.

Figure 4:
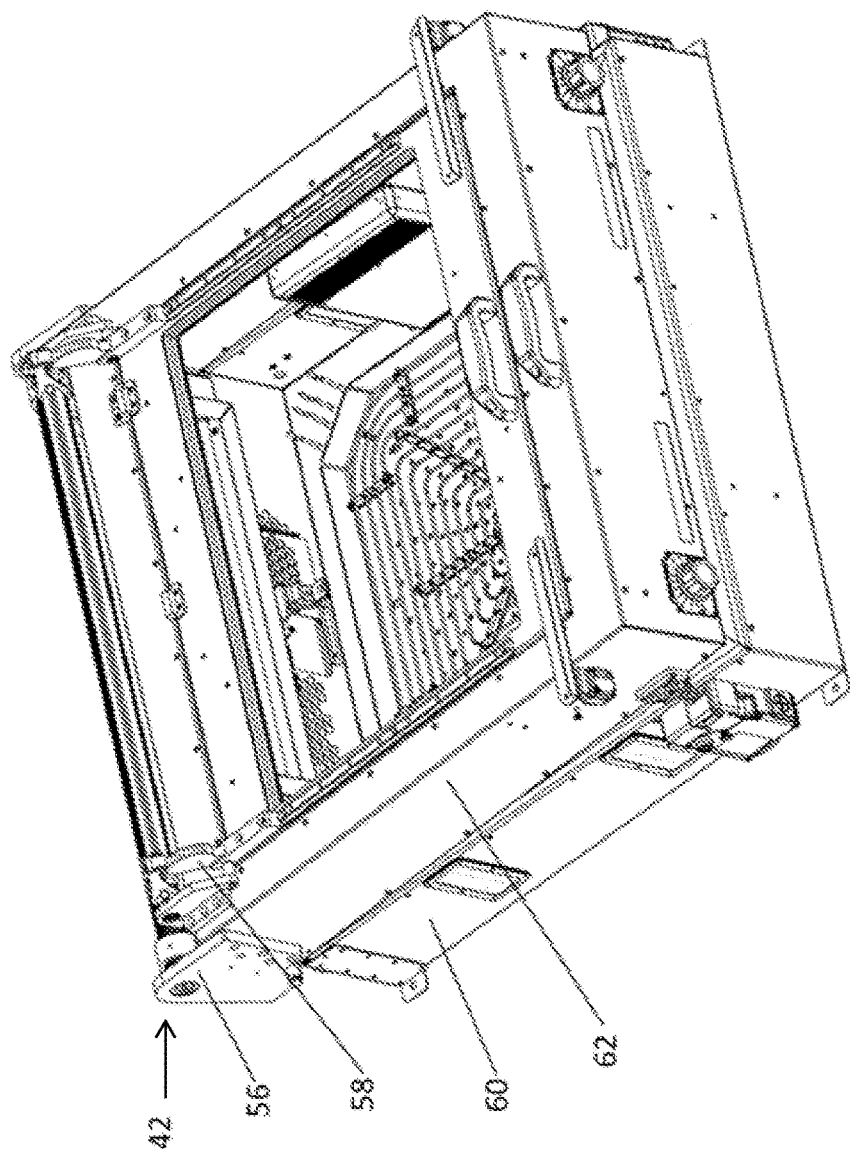
FIG. 4 illustrates the oven containing bottom and top halves, in accordance with example embodiments of the present disclosure.
Figure 7:
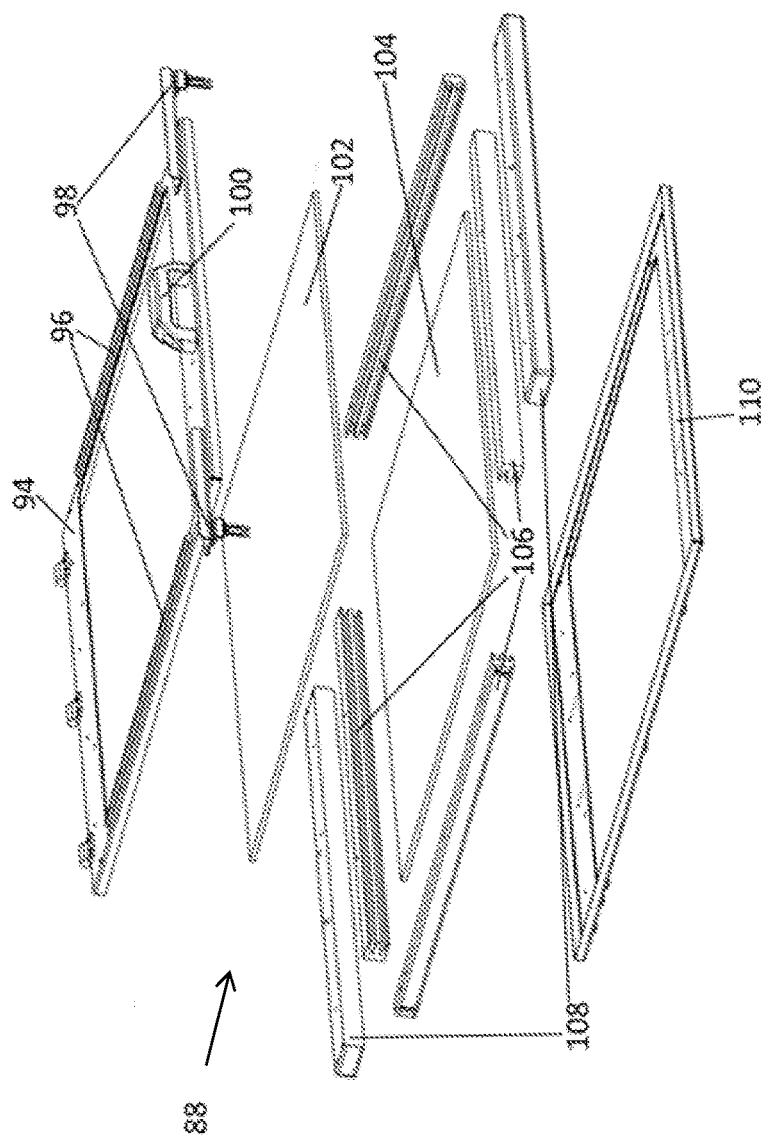
FIG. 7 illustrates an exploded view of the top lid, in accordance with example embodiments of the present disclosure.
Figure 8:
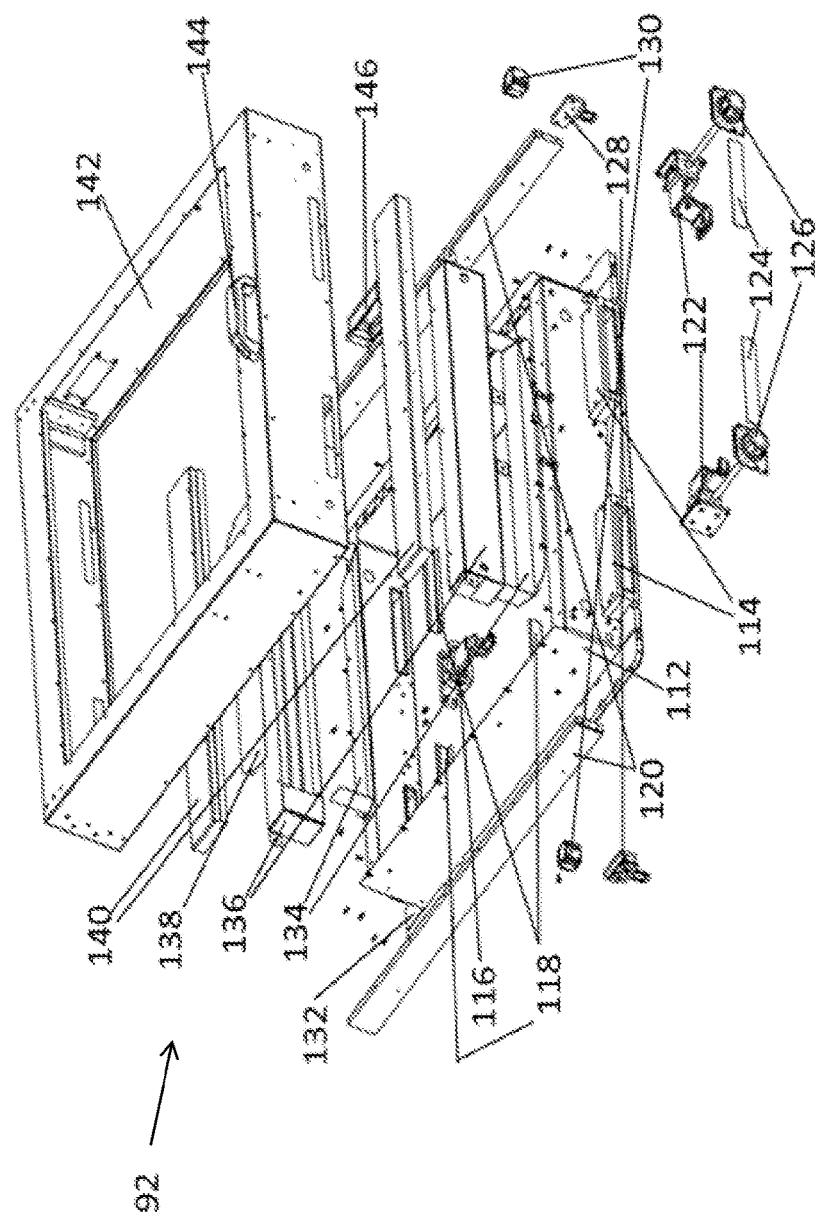
FIG. 8 illustrates an exploded view of the top half of the oven containing two top heaters, and excluding the top lid and grating, in accordance with example embodiments of the present disclosure.

Turning to FIG. 4, this figure shows the oven 42 in its entirety, highlighting a few parts. An oven bottom assembly 60 and an oven top and glass lid assembly 62 are described in further detail in association with FIG. 5 and FIGS. 6-9 respectively. Connecting these pieces together is a main oven counterbalance 56. This counterbalance allows the top and glass lid assembly 62 to open to 30° and 55° with a detent at each location. The top and glass lid assembly 62 includes an oven top assembly 92 and a glass lid assembly 88 as illustrated in FIGS. 7 and 8. The main counterbalance 56 allows the user access to the sample under test or access to service and clean the oven 42. A glass lid counterbalance 58 allows a glass lid assembly 88 (shown in FIG. 7) to lift away from an oven top assembly 92 stopping with a detent at 45°. The glass lid assembly 88 is lifted in order to swap out or clean the grating 90 or for servicing and cleaning of the oven 42. The glass lid assembly 88 and oven top assembly 92 are described in more detail in association with FIG. 7 and FIG. 8 respectively.

Figure 5:
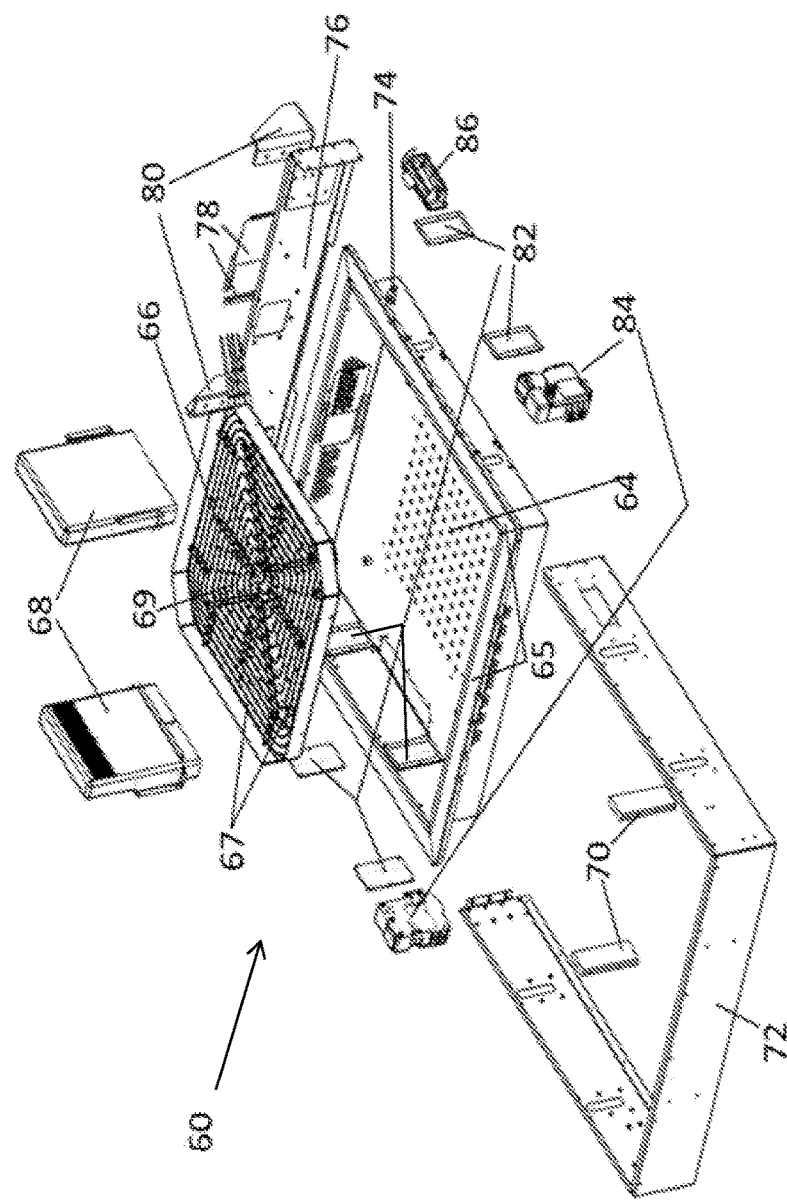
FIG. 5 illustrates an exploded view of a bottom half of the oven, in accordance with example embodiments of the present disclosure.

Turning to FIG. 5, this figure shows an exploded view of the oven bottom assembly 60. The oven bottom assembly 60 includes an inner oven bottom 64 which is a sheet metal piece that provides mounting points for multiple structures in the oven bottom assembly 60. This sheet metal piece has numerous holes and slots drilled into its surface for purposes of air exhaust out, blown cooling in, rear access for modules, slots to allow the stage motion assembly 40 into the oven 42, and other holes for mounting fasteners. Air is pulled out of the oven through the numerous, patterned holes in the center of the inner oven bottom 64 by one of the three exhaust motors 39. Further, the numerous patterned holes in the front and back of the inner oven bottom 64 allow air to enter the oven, blown by the air conditioning units 38. A bottom oven upper insulation 65, made of G11 material, which is a thermal insulator, is mounted to the perimeter of the inner oven bottom 64. The bottom oven upper insulation 65 is used to give the oven structure and help to create a seal of air for thermal insulation between the inner oven bottom 64 and an outer oven bottom 72 and outer oven bottom back 76.

Mounted to the inner oven bottom 64 is a bottom heater 66 which is the main supply of thermal energy. The bottom heater 66 uses electrical current and electrical resistance to generate heat in an outer heater zone 67 and an inner heater zone 69. These two zones can be controlled separately, so that temperatures of the two heaters zones are independent. Power output for the inner heater zone 69 and outer heater zone 67 can be changed by the user. For example, if the sample under test is getting hot in its center faster than its edges, the user may decrease the power percentage to the inner heater zone 69 to even out sample heating. The high temperatures from the heater zones will transfer heat via IR radiation to a sample under test in the oven 42 and placed upon the sample support 54. Some energy transfer from the hot zones is also expected via free air convection, but this effect makes up a noticeably smaller percentage of the heat transferred to the sample under test due to minimal air movement in the sealed oven 42. The technology used in the bottom heater 66 is custom manufactured by the company Thermocoax and includes an electrically charge Inconel material core metal, surrounded by a compacted powder and finally an outer stainless steel. The compacted powder effectively transfers heat from the Inconel core to the stainless steel, without transferring electrical current. This allows electricity to pass through an inner core of the wire and increase in temperature, without exposing the user to any electrical current. The wire of the outer heater zone 67 and inner heater zone 69 itself is of a consistent diameter, material, and temperature when exposed to the same electrical current. Additionally, the percentage of wire present within any area is designed to be nearly constant when looking over larger portions of the oven area. By controlling density of wire in an area, wire diameter, wire material, and wire temperature; lateral temperature uniformity can be controlled by adjusting only the power going to the outer heater zone 67 and inner heater zone 69. Two exhaust manifolds 68 mount inside the inner oven bottom 64 and draw air out of the upper volume of the oven 42. The air is drawn through the exhaust manifolds 68 by two of the three exhaust motors 39. Eventually all exhaust air exits out the lower half of the back cover panels 18 of the system. Multiple insulation spacers 70 help give the oven shape and direct air coming from the air conditioning units 38. An outer oven bottom 72 makes up the front, left and right sides of the oven bottom assembly 60, having multiple mounting and through holes for different structures and connections. The outer oven bottom 72 is attached to an outer oven bottom back 76 to complete the oven bottom assembly 60 exterior.

An over-temperature snap switch 74 is mounted to the inner oven bottom 64, being used for safety to protect against extreme temperatures in the oven. The over-temperature snap switch 74 disconnects electrical power to all heating elements upon reaching 150° C. This should not happen during normal operation. A module access port 78 mounts to the outer oven bottom back 76 and is used to allow routing of external cables and modules into the oven 42. Two main counterbalance supports 80 are mounted to the outer oven bottom back 76 and the oven plate 37 in order to provide rigidity to the structure and metal, particularly in regard to the torque from the lifting motion serviced by the main counterbalance 56. The eight seals 82 are attached to the inside of the inner oven bottom 64 and outside of the outer oven bottom 72, four to each. The seals 82 are made of two layers of silicone and a metal frame. The silicone material has offset slits in two layers of the material to allow the main support arms 52 to pass through, while sealing off the oven 42 from external air. Two main oven interlocks 84 mount to the outer oven bottom 72 and are used for latching and locking between the oven bottom assembly 60 and top and lid assembly 62. The male portion of this latching system is made up of two main lid latches 128 shown in FIG. 8. The main latches 128 are locked during thermal testing and when elevated temperature exist within the oven. In FIG. 5, a bottom heater power connector 86 is attached to the outer oven bottom 72 and is used to connect power between the electrical cabinet 36 and the bottom heater 66.

Figure 6:
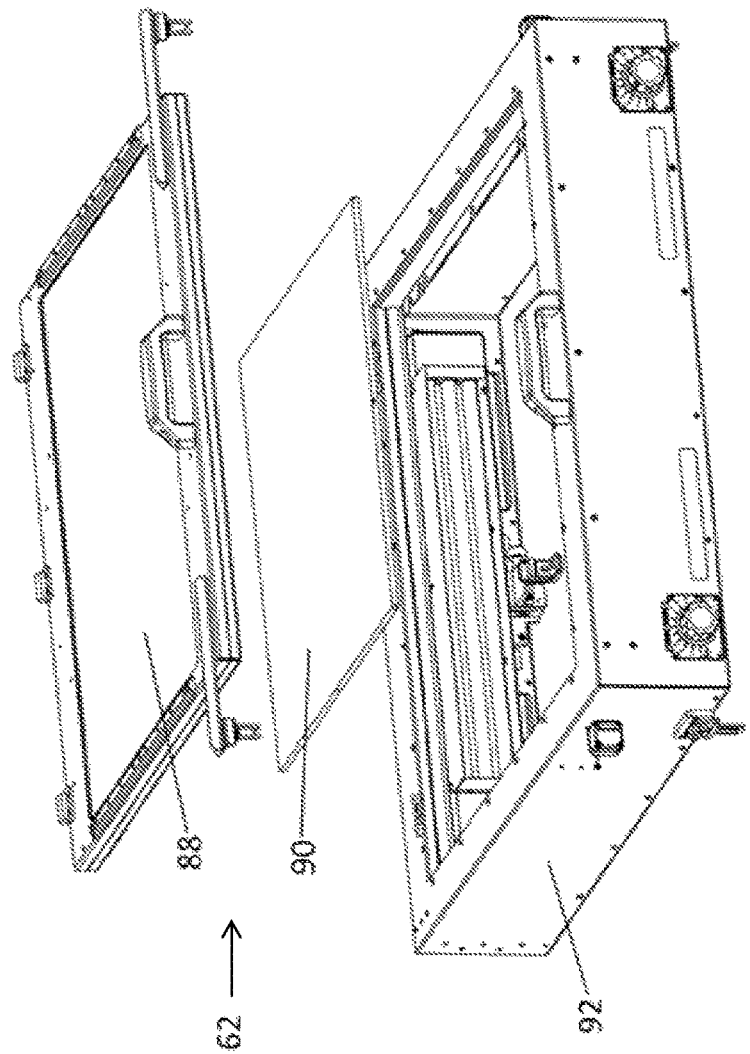
FIG. 6 illustrates a view of a top half of the oven with a top lid and grating exploded above, in accordance with example embodiments of the present disclosure.

Turning to FIG. 6, this figure illustrates a partially exploded view of the top and glass lid assembly 62 that includes the glass lid assembly 88 and the oven top assembly 92. In particular, the glass lid assembly 88 is attached to the oven top assembly 92 via the glass lid counterbalance 58, as shown in FIG. 4. Further detail of the glass lid assembly 88 is described in association with FIG. 7 and further detail of the oven top assembly 92 is described in association with FIG. 8. In FIG. 6, by lifting the glass lid assembly 88 the grating 90 can be set within the oven top assembly 92. More specifically the grating rests on a back grating adjust stage 116 and two front grating adjust stages 122, both shown in FIG. 8. Access to remove the grating 90 is required to swap out grating with different line pitches or to clean the grating 90 surface.

Turning to FIG. 7, this figure shows an exploded view of the glass lid assembly 88. A top glass pack sheet metal 94 makes up the top portion of the glass lid assembly 88. Two module mounting rails 96 connect to the top glass pack sheet metal 94. As discussed, details on the modules are not discussed in the specification or claims for sake of brevity, but the rails 96 are part of the standard oven. Two glass lid latches 98 are used to latch and lock the glass lid assembly 88 to the oven top assembly 92. The latches 98 connect to two glass lid interlocks 130 shown in FIG. 8. In FIG. 7 a glass lid handle 100 is used by a user to grasp and lift the glass lid assembly 88. On the bottom of the glass lid assembly 88 is a bottom glass pack sheet metal 110. The bottom glass pack sheet metal 110 and the top glass pack sheet metal 94 bolt together and sandwich the remaining pieces of the glass lid assembly 88 together, holding glass and G11 material pieces in place. Four lid glass holders 106 are made of an insulating G11 material and attach to each other in a square and hold between their machined surfaces a top lid glass 102 and a bottom lid glass with IR reflect 104. The double panes of Borofloat glass are used to allow both a window for measurements via the shadow moiré optics 32 and retain heat inside the oven assembly 42. The bottom lid glass 104 is unique in that it has a coating applied to the bottom surface that is designed to reflect infrared (IR) light wavelengths, while allowing penetration of visible light wavelengths. Two pieces of lid glass insulation 108 are included within the glass lid assembly 88 to provide thermal insulation.

Turning to FIG. 8, this figure shows an exploded view of the oven top assembly 92. The oven top assembly 92 includes an inner oven top 112 which is a four sided piece formed of sheet metal and arranged such that it defines the inner structure of the oven top assembly 92, having multiple openings and bolt connections. Four external air intakes 114 are attached to the inner oven top 112 in front and back of the oven 42. The purpose of these ports is to create air inlets into the oven 42. Since the oven is designed to be sealed, airflow in and out of the system must be managed, so as to not create pressure in the system or cause leaking of oven sealing. Air is designed to flow in through the intakes 114 when the exhaust motors 39 turn on. The exhaust motors 39 have a higher total flow rate than the air conditioning units 38, so when both are turned on, air will still flow into the oven 42 at a lower flow rate than using only the exhaust motors 39, through the intakes 114. Four flapper valves 118 have a hinged mounting to the inner oven top 112 and function via gravity and pressure to act as a one-way valve to allow air in through the intakes 114, but to also close and restrict airflow out of the oven 42. Four external air intake covers 124 made of a metal mesh, are placed over the intakes 114 for system aesthetics. The back stage 116 and the front stages 122 mount to the inner oven top 112 and hold the grating 90. The stages can be manually moved up and down over approximately a 10 millimeter range, for the purposes of measurement setup. Two front grating adjust knobs 126 connect to the front stages 122, allowing adjustment of the stages from the outside of the oven assembly, routing through both the inner oven top 112 and a top oven outer shell 142. The front grating adjust knobs 126 include a round numbering dial from 0 to 10 millimeters that correlates with vertical motion of the front stages 122. Two oven top perimeter insulations 120 and four lid bottom insulations 132 surround and attach to the inner oven top 112, giving the oven 42 structure and thermal insulation. The main latches 128 and the glass lid interlocks 130, both already discussed, mount to the top shell 142. Two bottom reflectors 134 and two top reflectors 138 mount respectively to the bottom and top of two top heater assemblies 136. The reflectors are used to direct energy toward the sample under test, specifically designed around experimentally determined temperature uniformity within the oven 42. The final design includes the top reflectors 138 extending straight away from the top heater assemblies 136 by approximately 1.3 inches. The bottom reflectors 134 extend the same approximate 1.3" away from the top heater assemblies 136 but are angled toward the top heater assemblies 136 by an 18° bend. The reflectors and housing of the top heater assemblies are made of an aluminized steel. The top heater assemblies 136 are illustrated and will be described in more detail in association with FIG. 9. In FIG. 8, two top lid insulations 140 are mounted between the inner oven top 112 and top shell 142 providing oven sealing and structure. A main lid handle 144 is used to grasp and lift the top and lid assembly 62. A top heater power connector 146 mounts to the top shell 142 and is used to connect power between the electrical cabinet 36 and the top heater assemblies 136.

Figure 9:
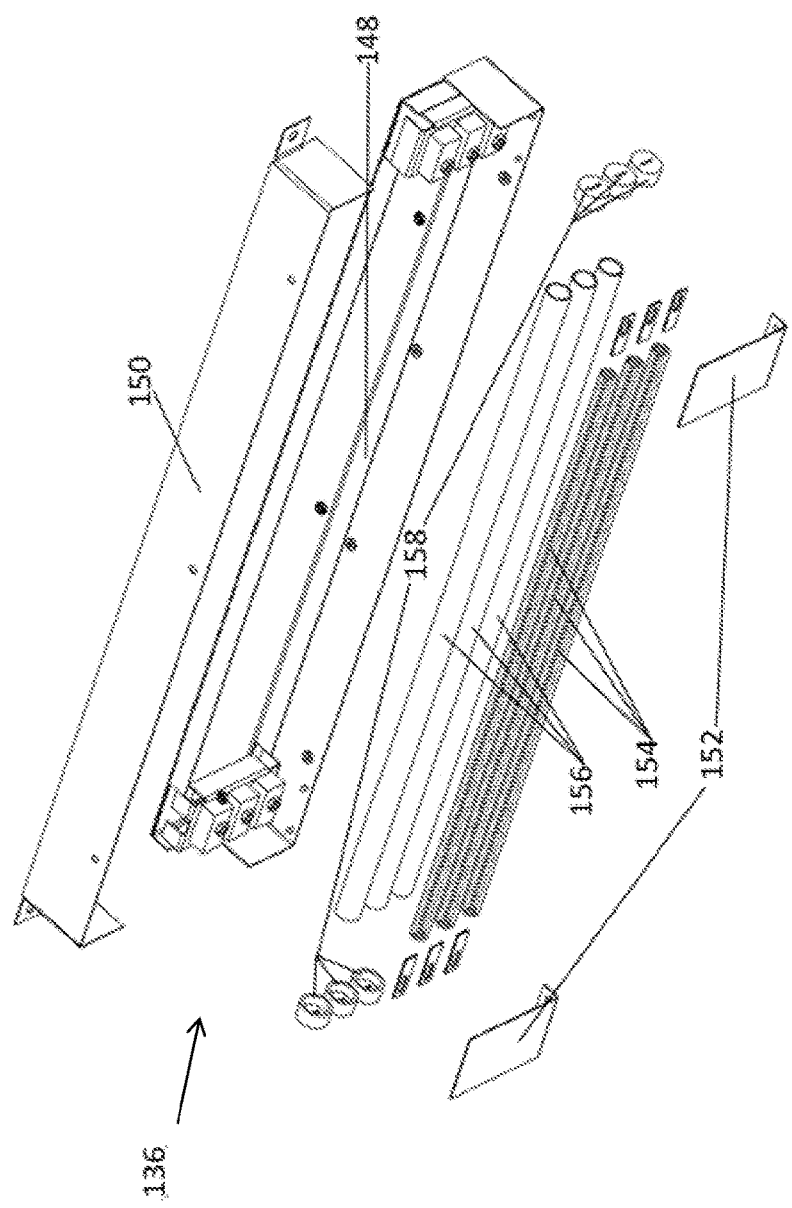
FIG. 9 illustrates an exploded view of one of the two top heaters, in accordance with example embodiments of the present disclosure.

Turning to FIG. 9, this figure shows an exploded view of the top heater assembly 136. Two identical top heater assemblies 136 are included in the oven 42; only one is shown in FIG. 9. The top heater assembly 136 includes a top heater bottom housing 148 and a top heater top housing 150 which mount together. Two bulb access plates 152 mount and hinge on the top heater top housing 150 and are in place for electrical safety and aesthetics. The heating elements of the top heater assembly 136 include three elements each containing a top heater IR wound element 154 surrounded by a dark ruby quartz tube 156, which are each held together with two IR element endcaps 158. The wound element 154 then mounts both mechanically and electrically to the top heater bottom housing 148. Light wavelengths generated by the wound elements 154 are in both the visible and shortwave infrared spectrums. Light and energy are created by passing current through the wound elements 154, which has specific electrical resistance. In this case each wound element 154 has an approximate electrical resistance of 5.3 ohms. By design, light wavelengths generated by the heating elements in general must cover a range of light wavelength. Here light wavelengths greater than 2750 nanometers will have minimal transmission through the Borofloat material of the grating 90. However, light wavelengths below 700 nanometers will appear as visible light and, being above the shadow moiré grating 90, will affect the measurement capability of the tool. Thus the dark ruby quartz tubes 156 are designed to filter out the visible light emitted from the wound element 154 and keeping the shortwave infrared wavelengths needed for heating the sample through the grating 90. The wound element 154 has minimal light wavelengths greater than 2750 nanometers by design. The remaining light wavelengths greater than 2750 nanometers will primarily be absorbed into the grating 90 itself. While heating the grating 90 directly can help with top to bottom temperature uniformity, transmitting through the grating 90 and hitting the sample directly is much more efficient.

In order to more fully describe the apparatus and process of the measurement system 12, further discussion of the control scheme used between the bottom heater 66 and top heater assembly 136 is required. A PLC (Programmable Logic Controller) (not shown) is used within the electrical cabinet 36. This PLC is used as part of the control of the measurement system 12 as a whole, for a number of the electromechanical devices in the measurement system 12, such as the exhaust motors 39 and main oven interlock 84, as is common for this type of machine. However, the interaction of the PLC with the oven 42 is worth discussing in more detail. A workflow of this control is illustrated and described in more detail in association with FIG. 11. The technology relies on the user to make adjustments to multiple variables in order to obtain the thermal conditions desired, in the top portion of the workflow in FIG. 11. For example, if the outside of the sample under testing is getting too hot, the user may decrease the Bottom Heater Outer Max variable. In another example, if the user wishes to make the bottom of the sample under test warmer in comparison to the top of the sample under test, the user can change the Top Heater Setpoint Offset variable. Multiple iterations may be required to optimize performance for different applications. Some general understanding of system controls is required to design such a system. The development of the PLC logic requires testing to find the correct controls settings between thermocouple temperatures, set-point temperatures, and input power percentages. The PLC contains two PID (Proportional, Integral, Derivate) control loops. The first loop exist between the bottom heater setpoint, the first thermocouple, and the bottom heater power. The second control loop exists between the top heater setpoint, the second thermocouple (or optionally the first thermocouple), and the top heater power. Within this control scheme the top heater is run in and on/off fashion, rather than at variable power levels. An on/off heating mode means that the top heater power is either 100% or 0%. Since the heating of the sample due to changes in top heater power is slow to respond, an on/off control scheme is preferred. The PLC looks at set-point temperatures, along with current temperature from the thermocouples and makes decisions on oven power based on PID logic. This workflow of logic is used to effectively control the input power of the outer heater zone 67, the inner heater zone 69, and the top heater assembly 136.

Figure 11:
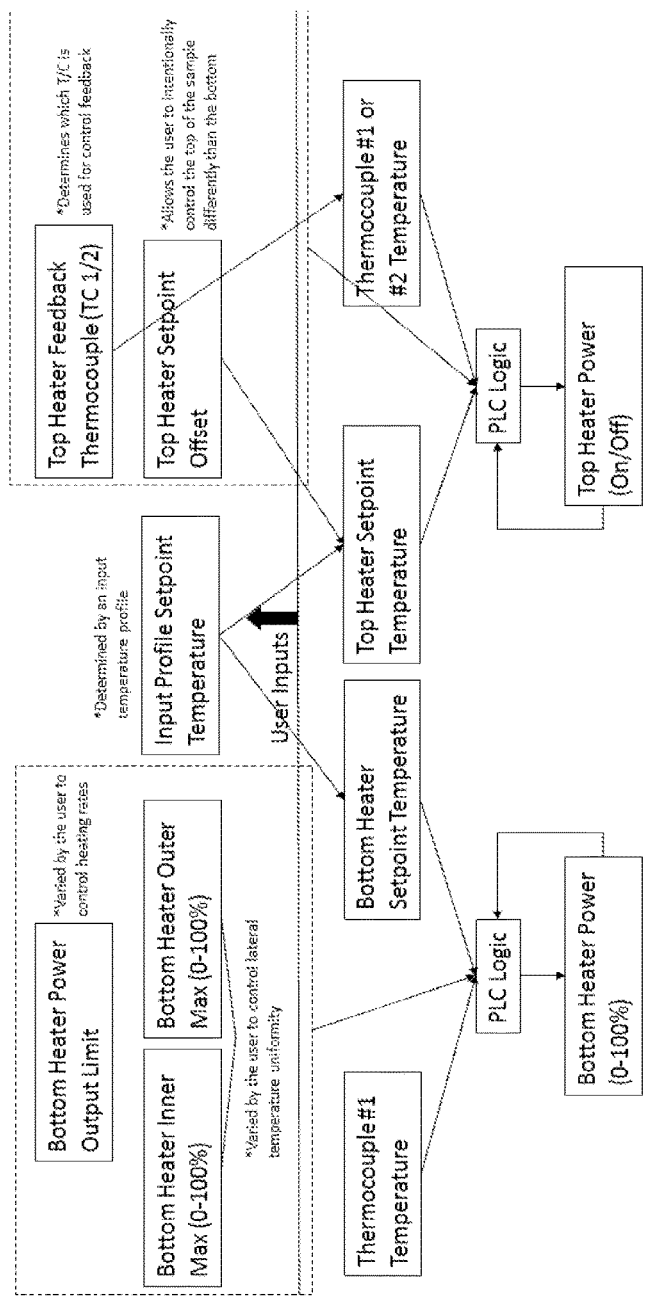
FIG. 11 illustrates a PLC logic diagram for control on an oven, in accordance with example embodiments of the present disclosure.

As an example consider the following inputs from the user, referencing FIG. 11: Bottom Heating Power Output Limit=100%, Bottom Heater Inner Max=80%, Bottom Heater Outer Max=95%, Top Heater Feedback Thermocouple=TC 2, Top Heater Setpoint Offset=−10° C. Within this example consider a point in time (1) where: Input Profile Setpoint Temperature=100° C., First Thermocouple Temperature=50° C., Second Thermocouple Temperature=50° C. By considering the Input Profile Setpoint Temperature and Top Heater Setpoint Offset, the Bottom Heater Setpoint Temperature=100° C., and the Top Heater Setpoint Temperature=90° C. For the conditions at time (1) the expected oven output would be: Inner Bottom Heater Power=80%, Outer Bottom Heater Power=95%, Top Heater Power=On. Now consider the same variables at time (2) where the First Thermocouple Temperature=94° C., and the Second Thermocouple Temperature=91° C. The first Thermocouple is approaching its 100° C. Setpoint. The PLC will consider the 6° C. difference between First Thermocouple Temperature and the Bottom Heater Setpoint Temperature (proportional term), the history of offset between the First Thermocouple Temperature and the Bottom Heater Setpoint Temperature (integral term), and the rate of heating (derivate term) of First Thermocouple to determine the power percentages to provide to the heater. Realistically the power percentages at this point in time may be: Inner Bottom Heater Power=20%, Outer Bottom Heater Power=24%. A different set of PID settings are used for the Top Heater Power considering the Second Thermocouple Temperature and the Top Heater Setpoint Temperature. Recall that with the Top Heater Setpoint Offset, the Second Thermocouple Temperature has exceed the Top Heater Setpoint Temperature, in which case the Top Heater Power is likely off.

The manner of using the measurement system 12 is through both software and mechanical interaction. Most use of the measurement system 12 is via the software described herein and associated with the measurement system 12, which runs the different heating, optical, and motion structures used in the system. The software is accessed via the PC interface assembly 14, which connects to the PC 15 shown in FIG. 2.

All mechanical interactions with the measurement system 12 are typically done before or after at temperature flatness testing. These interactions are typically done to setup the system for different sample types and applications or at the conclusion of a test.

Mechanical interactions to the measurement system 12 involve the following:

- In FIG. 2, the button assembly 34 is used to turn on main power to the measurement system 12, the exhaust motors 39, and/or the air conditioning units 38. It is also used to put the measurement system 12 into emergency stop, cutting all power to the oven 42 and stage motion assembly 40 for safety reasons. A button (not shown) is also provided to momentarily allow voltage to the stage motion assembly 40 by holding down the button, which can be helpful in test setup. Finally, the button assembly 34 allows the user to open the main oven interlocks 84 and glass lid interlocks 130, shown in FIG. 5 and FIG. 8 respectively, for access inside the oven when temperature is appropriately low for safety (below 50° C.).
- The grating 90 can be moved up and down and tilted to certain angles, helpful in setting up a flatness measurement. This adjustment is done via the front grating adjust knobs 126, which move the front grating adjust stages 122 up and down. Additionally, the back grating adjust stage 116 can be moved up and down directly by reaching inside the oven. All stages are shown in detail in FIG. 8.
- The shadow moiré optics 32 include a camera lens which can be adjusted for zoom, focus, and iris. These adjustments are done prior to any measurements.
- Access inside the oven 42 for test setup is serviced by mechanical lifting of the top and glass lid assembly 62.

A sample or sample under test in the measurement system 12 is placed on the sample supports 54 by the user with the top and glass lid assembly 62 at a 30° detent. Access to replace or clean the grating is served by mechanically lifting of the glass lid assembly 88.

Figure 10:
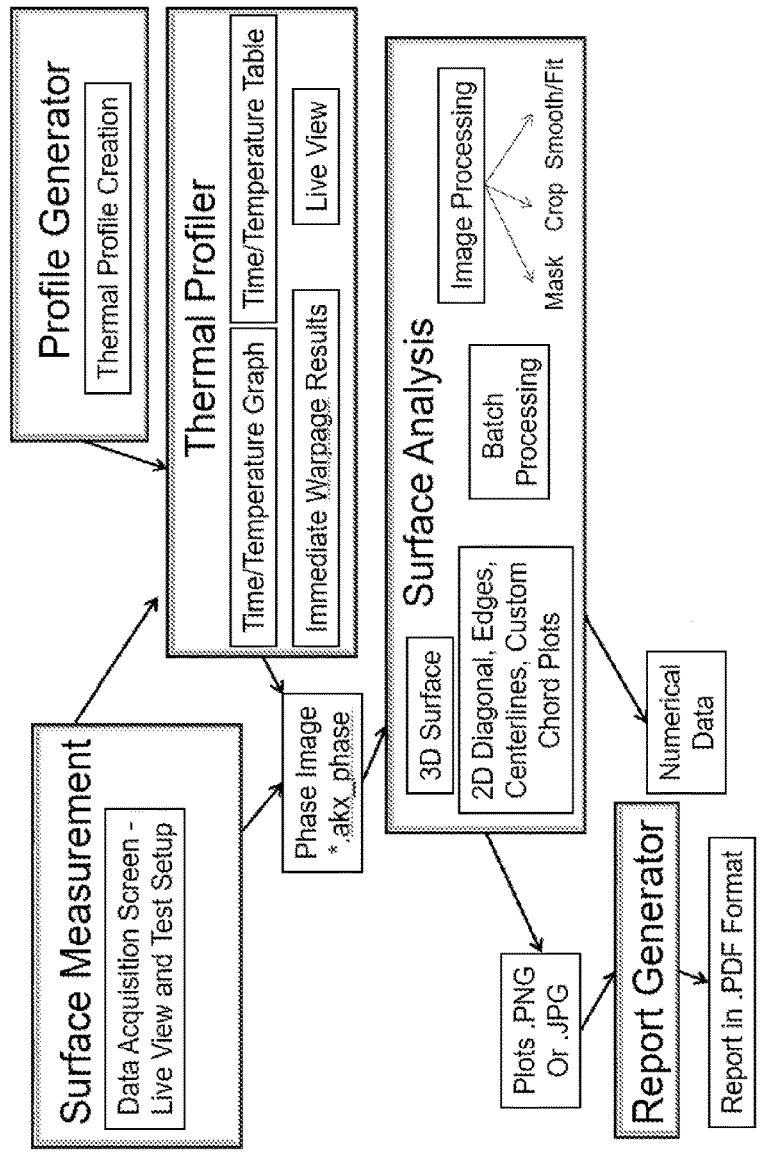
FIG. 10 illustrates the software workflow for a thermal shadow moiré measurement system, in accordance with example embodiments of the present disclosure.

With the exception of these means of mechanically interfacing with the measurement system 12 and setting up for different sample types, normal operation of the tool is done through the software associated with the measurement system 12 which is described below. The workflow associated with the measurement system 12 is shown graphically in FIG. 10.

The software begins with the Profile Generator software, which is used to create a plot of temperature versus time. This plot then has acquisition functions, which tell the measurement system 12 to take a measurement involving the shadow moiré optics 32 and stage motion assembly 40, and cooling functions, which turns on the exhaust motors 39 and/or air conditioning units 38. A file is saved describing the temperature versus time plot.

Test setup and calibration of the measurement system 12 is performed within the Surface Measurement software. Calibration of the measurement system 12 involves measuring a known height two step block and correlating this known height with the values found by the shadow moiré measurement. Acquisition of a flatness measurement can be performed in Surface Measurement. This involves taking four camera images from the shadow moiré optics 32, taken at different distances from the grating 90 by moving the stage motion assembly 40 incrementally downward. The stage motion assembly 40 then returns the sample to its starting point. In Surface Measurement the user can also adjust camera exposure time, stage height, noise filtering, sample regions of interest, and add numerical gauges for data understanding.

The Surface Measurement software works in tandem with the Thermal Profiler software to take flatness measurements while heating and cooling a sample or samples. The same measurement setup from Surface Measurement is applied when opening the Thermal Profiler software. The Thermal Profiler software is used to take measurement over elevated temperatures. Two K-Type thermocouples are attached to the sample to track the sample temperature. The thermocouples are routed from the electrical cabinet 36. The first thermocouple is used as a control feedback loop for the bottom heater 66 and the second thermocouple is used as a separate control feedback loop for the top heater assemblies 136. The sample under test is placed on the sample supports 54, at which point further setup adjustments to shadow moiré optics 32 or sample height, as previously discussed, can be made. The user then loads a software file originally created with Profile Generator. After which the test is started and the actual temperature of the sample is tracked along with the input temperature and timing originally programmed. During the heating and cooling, measurements are taken and immediate surface flatness data is shown. Data files are saved for further data processing for each acquisition. The data files can come from either Thermal Profiler or Surface Measurement software and are given a custom file extension, *.akx_phase. Given the heating performance of the sample under test, the user may wish to go back and adjust variables in either the input profile from Profile Generator or the variables in Thermal Profiler that affect temperature control as highlighted in the top portion of FIG. 11. These adjustments are available to allow a user to better mimic production conditions seen by the sample under test.

The interaction of Profile Generator, Surface Measurement, and Thermal Profiler comprise all of the software needed to run the measurement system 12. Further software, such as Surface Analysis software is provided for much more detailed analysis and processing of the surface flatness measurements. Surface Analysis software is the most complex software of the suite, providing many different options for processing of the measured surfaces. The Surface Analysis software can be used external to the equipment. The Report Generator software is a software reporting tool used to transfer data to an easy to readable format and can also be used external to the measurement system 12.

Figure 13:
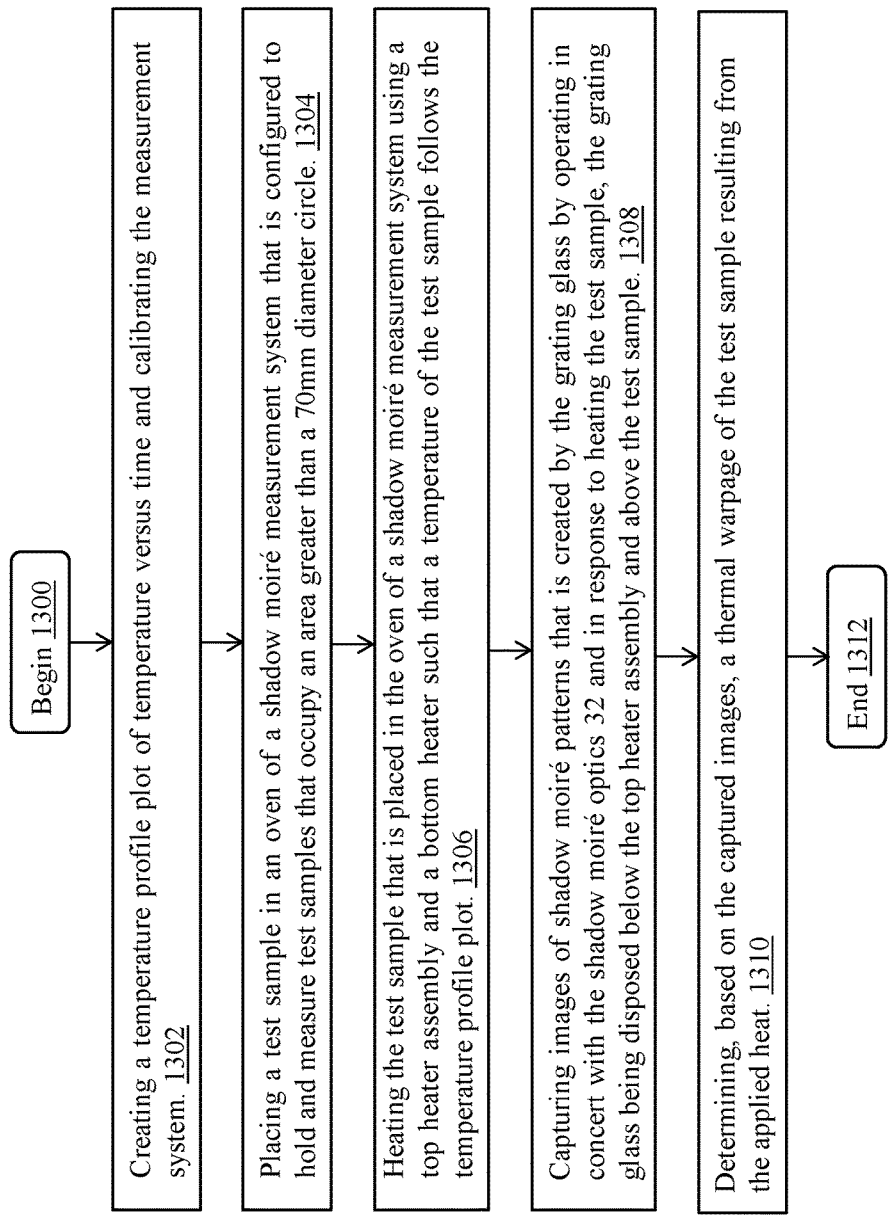
FIG. 13 is a flowchart that illustrates an example method of operation of the thermal shadow moiré measurement system for thermal warpage measurement of a sample under test, in accordance with example embodiments of the present disclosure.

Turning to FIG. 13, this figure is a flowchart that illustrates an example method of operation of the thermal shadow moiré measurement system for thermal warpage measurement of a test sample, in accordance with example embodiments of the present disclosure. In particular, the example method of operation of the measurement system 12 begins at operation 1300 and proceeds to operation 1302. In operation 1302, a plot of temperature versus time is created using the Profile Generator software module and the measurement system 12 is calibrated using the Surface Measurement software module, as discussed above. Then, in operation 1304, the test sample is placed on the sample support 54 of an oven 42 that is configured to hold and conduct warpage measurements on test samples that occupy an area greater than a 70 mm diameter circle. The sample support 54 is configured to be vertically movable by virtue of being coupled to a stage motion assembly 40 as discussed above in association with FIG. 3. Responsive to placing the test sample in the oven 42 and closing the oven 42 (e.g., locking the oven top and glass lid assembly 62 to the oven bottom assembly 60), in operation 1306, the test sample is heated using the top heater assembly 136 and the bottom heater 66 such that a temperature of the test sample follows the plot of plot of temperature versus time. In particular, the top heater assembly 136 and the bottom heater 66 are individually and separately controlled by the PLC based on a top heater feedback control loop and a bottom heater feedback control loop, respectively. Further, in operation 1308, the shadow moiré optics 32 is used to capture images of shadow moiré patterns that is created by the grating glass by operating in concert with the shadow moiré optics 32 in response to heating the test sample. The images are captured at pre-determined time periods and at pre-determined temperatures of the test sample during the heating of the test sample. The pre-determined time periods and the pre-determined temperatures at which the images are captured may be assigned when the plot of temperature versus time is created. Responsive to capturing the images, in operation 1310, the measurement system 12 determines a warpage of the test sample as a result of heating the test sample based on the captured images.

As described above, one of skill in the art can see that the thermal shadow moiré measurement system provides specific advantages over previous art. Specifically, the tool allows for the top of a sample to be heated efficiently and in a controlled fashion within a shadow moiré tool. Previous art provides ineffective means to heat an area larger than a 70 mm diameter evenly and quickly, in this embodiment as fast as 3.5° Celsius per second. This uniform heating within a shadow moiré system is made possible by a combination of a multi-zone controllable bottom heater and an IR reflective coating on the lid glass on top of the oven. Additionally, in order to heat evenly from top to bottom, infrared radiation, that is kept to a specific light wavelength, is needed for both penetration of the Borofloat grating glass, as well as removal of visible light wavelength that would interfere with the shadow moiré measurement. This is achieved by using short wave infrared bulbs and applying a visible light filter as part of the quartz tube itself. In particular, the Borofloat grating glass has a light transmission curve such that light wavelengths from 400 to 2000 nanometers exhibit 85-90% light transmission through the glass. Further, between 2000 to 2750 nanometer wavelengths the light transmission begins to significantly reduce, and at 2750 nanometers almost no light is transmitted through the Borofloat glass.

Furthermore, the system has the additional advantage in that
- it minimizes airflow within the system during heating, eliminating potential effects of sample vibration from air currents, if heating with convective air;
- it allows the user to adjust heater power in different zones to compensate for any temperature non-uniformity caused by the geometry or surface optical properties of the sample;
- it allows intentional and controllable temperature non-uniformity of a sample should a user wish to replicate an uneven heating scenario;
- it makes outgassing materials coming from the samples under test less likely to cloud the grating and interfere with measurements given the geometry of the tool;
- it is not specifically limited to the 375×375 mm design concept.

Although the description above contains many specificities, these should not be construed as limiting the scope of the invention but as merely providing illustrations of some of the presently preferred embodiments of this invention. For example, the physical size and bottom heating elements could be made larger or smaller or swapped for a different heating transfer method; the motion system for the phase stepping solution could be designed to move the grating instead of the sample support.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A shadow moiré measurement system comprising:
   a shadow moiré optics;
   an oven that is disposed below the shadow moiré optics and comprising:
      an oven top and glass lid assembly and an oven bottom assembly that are hingedly coupled to each other;
   a grating glass that is disposed in the oven top and glass lid assembly of the oven, wherein the shadow moiré optics and the grating glass operate in concert to create shadow moiré measurement patterns;
   a sample support that is disposed below the grating glass in the oven bottom assembly of the oven and configured to hold a sample under test;
   a stage motion assembly that is coupled to the sample support and disposed in the oven bottom assembly of the oven, wherein the stage motion assembly is configured to provide vertical motion of the sample support;
   a top heater assembly that is disposed in the oven top and glass lid assembly and above the grating glass and the sample support; and
   a bottom heater that is disposed in the oven bottom assembly and below the sample support,
      wherein the top heater assembly and the bottom heater are configured to be individually and independently controlled via their respective temperature feedback loops for uniform heating in the oven.

2. The shadow moiré measurement system of claim 1, wherein the top heater assembly and the bottom heater operate in concert to heat the oven through infrared (IR) radiation.

3. The shadow moiré measurement system of claim 1, wherein the oven is sealed from the surrounding environment.

4. The shadow moiré measurement system of claim 1:
   wherein the oven top and glass lid assembly comprises a glass lid assembly and an oven top assembly that are hingedly coupled using a glass lid counterbalance such that the glass lid assembly lifts away from the oven top assembly at approximately 45° angle with a detent, and
   wherein the grating glass and the top heater assembly is disposed in the oven top assembly.

5. The shadow moiré measurement system of claim 1:
   wherein the oven top assembly comprises a top oven outer shell and an inner oven top that is disposed within the top oven outer shell,
   wherein the inner oven top comprises one or more back stages and a pair of front stages coupled thereto and configured to hold the grating glass, and
   wherein the one or more back stages and the pair of front stages are vertically adjustable using at least a pair of knobs.

6. The shadow moiré measurement system of claim 1:
   wherein the glass lid assembly comprises a top lid glass and a bottom lid glass that are arranged such that they form a double pane glass assembly, and
   wherein a bottom surface of the bottom lid glass includes a coating that reflects infrared light wavelengths while allowing penetration of visible light wavelengths.

7. The shadow moiré measurement system of claim 1, wherein the bottom heater comprises an inner heater zone and an outer heater zone, and wherein the inner heater zone and the outer heater zone are independent and separately controllable.

8. The shadow moiré measurement system of claim 1, wherein the oven is configured to evenly distribute heat to a sample or multiple samples disposed on the sample support in the oven and occupying greater than a 70 mm diameter circle without exceeding +/−5° C. temperature differentials.

9. The shadow moiré measurement system of claim 1, wherein the top heater assembly comprises:
   at least one top heater wound element that is configured to generate light waves that are in both visible and shortwave infrared spectrums; and
   a dark ruby quartz tube that surrounds the at least one top heater wound element and is configured to filter out light waves in the visible spectrum and keep the light waves in the shortwave infrared spectrum.

10. The shadow moiré measurement system of claim 1, wherein the top heater assembly is configured to output light that fall within 700 to 2750 nanometers light wavelengths.

11. The shadow moiré measurement system of claim 1, further comprising an air-conditioning unit that is configured to lower the temperature of the oven or cool the oven, and a plurality of plurality of exhaust motors that are configured to manage air flow in the oven that is sealed to an external environment.

12. A shadow moiré measurement system comprising:
an oven that comprises:
an oven top and glass lid assembly that houses:
a top heater assembly that is configured to output light that falls within falls within 700 to 2750 nanometers light wavelength, the top heater assembly comprising a plurality of heater elements, wherein each heater element comprises:
a wound element that is configured to carry electrical current therethrough to generate visible light and shortwave infrared light; and
a dark ruby quartz tube surrounding the wound element and configured to filter visible light generated by the wound element; and
a grating glass that is disposed below the top heater assembly such that the grating glass is vertically adjustable within the oven top and glass lid assembly, wherein the grating glass is configured to pass light having light wavelength within 700 to 2750 nanometers therethrough; and
an oven bottom assembly that is hingedly coupled to the oven top and glass lid assembly, wherein the oven bottom assembly houses:
a sample support that is disposed below the grating glass such that the sample support is vertically adjustable within the oven bottom assembly, wherein the sample support configured to hold a sample that occupies an area greater than a 70 mm diameter circle.

13. The shadow moiré measurement system of claim 12, wherein the sample support is coupled to a stage motion assembly that is disposed in the oven bottom assembly, and wherein the stage motion assembly is configured to provide a vertical adjustment of the sample support.

14. The shadow moiré measurement system of claim 12, wherein the oven is sealed from the surrounding environment.

15. The shadow moiré measurement system of claim 12, wherein the top heater assembly and the bottom heater operate in concert to heat the oven through infrared (IR) radiation.

16. The shadow moiré measurement system of claim 12, wherein the oven bottom assembly further comprises a bottom heater that is disposed below the sample support, and wherein the top heater assembly and the bottom heater operate independent of each other and separately controllable.

17. The shadow moiré measurement system of claim 16, wherein the bottom heater comprises an inner heater zone and an outer heater zone, and wherein the inner heater zone and the outer heater zone are independent and separately controllable.

18. The shadow moiré measurement system of claim 12, wherein the oven bottom assembly further comprises a plurality of oven interlocks that are configured to latch and lock the oven bottom assembly and the oven top and lid assembly during thermal testing and when an elevated temperature exists within the oven.

19. The shadow moiré measurement system of claim 12:
wherein a glass lid assembly of the oven top and glass lid assembly comprises a top lid glass and a bottom lid glass that are arranged such that they form a double pane glass assembly, and
wherein a bottom surface of the bottom lid glass includes a coating that reflects infrared light wavelengths while allowing penetration of visible light wavelengths.

20. The shadow moiré measurement system of claim 19, wherein each of the top lid glass and a bottom lid glass comprises a Borofloat glass.

21. A method of a shadow moiré measurement system comprising:
heating a test sample that is placed in an oven of the shadow moiré measurement system using a top heater assembly and a bottom heater of the oven that are individually and separately controlled such that a temperature of the test sample follows a plot of temperature versus time that is created prior to placing the test sample on the sample support of the oven,
wherein the test sample is placed on a sample support of the oven that is configured to hold test samples that occupy an area greater than a 70 mm diameter circle,
wherein the sample support is disposed in an oven bottom assembly of the oven and is coupled to a stage motion assembly that is configured to provide a vertical motion to the sample support,
wherein the top heater assembly is disposed in an oven top and glass lid assembly of the oven and is configured to output light that falls within falls within 700 to 2750 nanometers light wavelength,
wherein the top heater assembly is disposed above a grating glass that is housed in oven top and glass lid assembly and configured to pass the output light from the top heater assembly having light wavelength within 700 to 2750 nanometers light wavelength therethrough, and
wherein the test sample is disposed below the grating glass;
capturing, using a shadow moiré optics assembly, images of shadow moiré patterns created by the grating glass in response to heating the test sample at pre-determined time periods and temperatures of the test sample during the heating of the test sample; and
determining a warpage of the test sample as a result of heating the test sample based on the captured images.

22. The method of claim 21, further comprising calibrating the shadow moiré measurement system after creating the plot of temperature versus time and before placing the test sample on the sample support for measuring the warpage of the test sample.

23. The method of claim 21,
wherein the top heater assembly and the bottom heater are individually and separately controlled by a programmable logic controller using a top heater feedback control loop logic and a bottom heater feedback control loop logic, and
wherein the top heater feedback control loop logic operates based on a top heater assembly setpoint temperature, an input received from a first thermocouple that is coupled to the test sample, and a power of the top heater assembly, and
wherein the bottom heater feedback control loop logic operates based on a bottom heater assembly setpoint temperature, an input received from a second thermocouple that is coupled to the test sample, and a power of the bottom heater.

24. The method of claim 21, wherein the top heater assembly comprises a plurality of heater elements, wherein each heater element comprises:

a wound element that is configured to carry electrical current therethrough to generate visible light and short-wave infrared light; and a dark ruby quartz tube surrounding the wound element and configured to filter visible light generated by the wound element.

25. The method of claim 21, wherein the oven top and glass lid assembly includes a glass lid assembly that comprises a top lid glass and a bottom lid glass that are arranged such that they form a double pane glass assembly, and wherein a bottom surface of the bottom lid glass includes a coating that reflects infrared light wavelengths while allowing penetration of visible light wavelengths.

* * * * *